(Model.)
L. T. CORNELL.
CARTRIDGE CAPPING AND UNCAPPING IMPLEMENT.
No. 246,868. Patented Sept. 13, 1881.
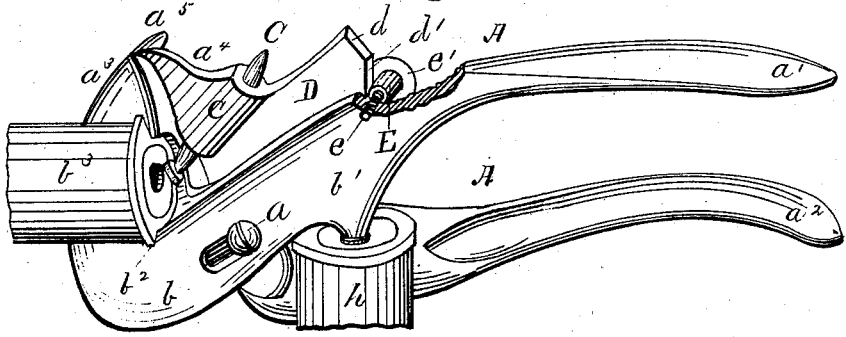
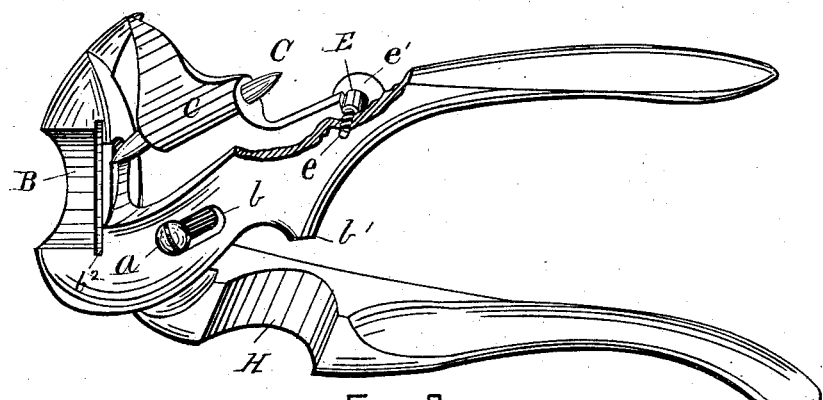
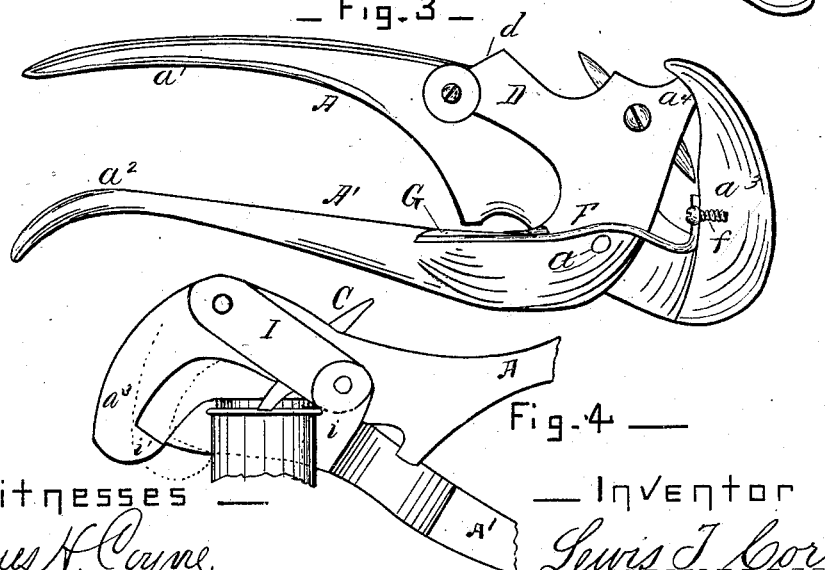

UNITED STATES PATENT OFFICE.

LEWIS T. CORNELL, OF CHICAGO, ILLINOIS.

CARTRIDGE CAPPING AND UNCAPPING IMPLEMENT.

SPECIFICATION forming part of Letters Patent No. 246,868, dated September 13, 1881.

Application filed November 11, 1880. (Model.)

*To all whom it may concern:*

Be it known that I, LEWIS T. CORNELL, a citizen of the United States, residing in Chicago, in the county of Cook and State of Illinois, have invented a certain new and useful Cartridge Capping and Uncapping Implement, of which the following is a specification.

My invention relates to cartridge cappers and uncappers, consisting of two S-shaped levers pivoted together so that their forward ends will form a fulcrum and their rearward ends handles for manipulating the same, and provided with a recess and a stud oppositely arranged between the pivot and the ends of the handles to facilitate the capping of a cartridge, and with a recess and a pin oppositely arranged between the pivot and the forward end of the implement for providing means for extracting the cap from the cartridge.

The objects of my invention are, first, to provide an implement which will firmly hold the cartridge and by a direct movement of the handles toward each other continuously operate the extracting-pin so that it will perforate the cap and extract the same as said pin is swung upon the inner sides of opposite arcs of a circle; and, second, to provide said implement with means for firmly holding a cartridge, and with a stud or pin operating substantially in a line through the length of the cartridge to force a cap into the same. I attain these objects by devices illustrated in the accompanying drawings, in which—

Figure 1 is a side elevation of an implement embodying my invention with the cartridges in position to be operated upon, showing the position of the extracting-pin after the cap is removed and the capping-stud in the position it assumes when pressing a cap into the cartridge; Fig. 2, a similar side elevation of the same with the cartridges removed and the capping-stud and extracting-pin elevated above their operative positions; Fig. 3, an opposite-side elevation, showing the spring actuating the handles to spread them open after the capping and uncapping operation is completed; and Fig. 4, a modification of the same.

Similar letters of reference indicate the same parts in the several figures of the drawings.

A A' represent two S-shaped levers, crossed and pivoted together by a set-screw, $a$, secured to the lever A', so that their rear ends will form handles $a'$ $a^2$, and their front ends jaws or heads $a^3$ $a^4$, respectively, which will impinge and move upon each other and form a center upon which said levers will move during the latter part of the operation performed by the compression of the handles, the lateral movement of said head being prevented by means of a flange, $a^5$, upon head $a^3$. The lever A is slotted at $b$, so that it may have a sliding movement upon the pivot $a$, and is provided between said pivot and the handles with a lug, $b'$, and at its forward end with a recess or seat, B, provided with annular groove $b^2$, which recess and groove correspond respectively with the body and flanged head of a cartridge, $b^3$, which, when inserted, will be firmly but removably held in position for the removal of the exploded cap. Lever A' is provided at its forward end with an enlargement, $c$, receiving and holding the extracting-pin C, which pin is pointed at both ends, so that it may be removed and reversed when one point becomes worn out from frequent usage.

Integral with the lever A', and in the rear of the extracting-pin, is an arm or extension, D, the free end of which is beveled at $d$ $d'$, respectively, in opposite directions, and engages with a stud or friction-roller, E, secured upon the lever A by means of a set-screw, $e$, or other suitable means. The stud or roller E is provided with a flange or washer, $e'$, upon its outer end or side, forming a guideway between it and the lever E, to prevent the displacement of the arm D when moving upon said roller.

In order to spread the handles and hold them in position for operation, a straight or slightly-curved spring, F, is secured by a set-screw, $f$, to the inner face of the forward end of the lever A, so that its free end will bear upon a stud, G, upon the side of the lever A', as shown in Fig. 3. Lever A' is also provided with a recess, H, oppositely arranged from the lug $b'$ of the lever A, for receiving a cartridge, $h$, to be capped, which cartridge is supported during the capping operation by reason of the flange of its head resting upon the walls of the groove.

From the above description it will be seen that when the handles and jaws are open and in position to commence the operation of extracting a cap the screw $a$ will be at the lower end of the slot $b$ and the friction-roller at the upper end of the bevel-face $d$ of the arm D. If, when in this position, a cartridge is inserted by a lateral movement in the recess B, so that the flange of its head will rest in the groove $b^2$, and the handles are compressed, the friction-roller and the bevel-face $d$ will move upon each other, the levers swing upon their pivot $a$, and the extracting-pin moves downwardly until it has entered the cap. At the time the extracting-pin fully enters the cap the friction-roller engages with the bevel-face $d'$, and the jaws impinge upon each other other at their points, so that as the handles are further compressed the pivot $a$ and the walls of the slot $b$ will move upon each other in opposite directions and the levers swing upon the center formed at the points of the impinging jaws, thus causing the extracting-pin to move upwardly upon an arc of a circle opposite that at which it entered the cap and extract the cap from the cartridge, as shown in Fig. 1.

It will thus be seen that I am enabled to puncture and extract the cap by a single, continuous, and direct movement of the handles toward each other without handling or moving the cartridge in the least. The cartridge is then placed in the groove or seat H with a fresh cap in position to be inserted, and the handles again compressed until the friction-roller engages with the bevel-face $d'$, said face being in substantially a vertical line with the length of the cartridge, at which time the lug $b'$ is brought in contact with the cap, so that upon further compressing the handles said lug will force the cap by substantially a vertical movement into the cartridge. I may, however, with facility simultaneously extract a cap from one cartridge and cap another by one operation of the implement.

Although the construction above described is deemed preferable, I may attain the desired objects set forth in the beginning of this specification, by means of the modification shown in Fig. 4, without departing from the spirit of my invention.

In the modification referred to the levers A A' are not crossed, but are connected together by means of a plate or link, I, pivoted upon the side of the lever A and to a stud or ear, $i$, upon the lever A'. The construction, and consequently the operation, of said levers is partially reversed—that is to say, the lever A carries the extracting-pin, and the lever A' is grooved to carry the cartridge-shell to be uncapped, as well as the shell to be capped. By reason of the position in which the lever A is arranged, the jaw $a^3$ of said lever is carried downwardly, and is concaved on the inner face, and terminates in a hook, $i'$, having a flat inner face, upon which, and upon the concave face of the lever, the convexly-curved end of the lever A' moves when the extracting-pin is in the act of entering the cap. When in the position for the pin to puncture the cap the handles are spread apart and the front end of the lever A is in the position indicated in dotted lines.

It will now be understood that if the handles are pressed toward each other the ends of the levers will impinge and the levers swing upon the pivot of the link on lever A'; but as soon as the cap is punctured the front end of lever A', and first the inner face of the concave face of the hook, and then the concave-faced lever A, will move upon each other as the link swings toward a line at a right angle to the handles. The extracting-pin is thus caused to enter and withdraw from the cap in precisely the same manner as in my preferred construction—that is to say, enter upon one arc and withdraw upon an opposite arc of a circle—by a continuous and direct movement of the handles toward each other.

The capper in the modification is operated in substantially the same manner as in the preferred construction. It will be observed that in both constructions the fulcrum of the levers is a shifting fulcrum—that is, it shifts from the pivot to the jaws or ends of the implement.

Although I have described the handles as operating toward each other, it is obvious that they may be made to operate in the opposite direction, away from each other, to operate the extracting-pin and capping-stud without departing from the gist of my invention—as, for instance, by connecting them with the jaws upon the opposite side of the pivot from their present arrangement.

Having thus described my invention, what I claim, and desire to secure by Letters Patent, is—

1. In an implement for removing caps from cartridge-shells, the combination, substantially as hereinbefore set forth, with the extracting-pin, of two pivoted levers having a hand-grasp, one lever carrying the cartridge-seat and the other the pin, said levers being joined by a shifting fulcrum.

2. The combination hereinbefore set forth, with the extracting-pin and with the capping stud or lug, of pivoted levers having seats for the shells and provided with a shifting fulcrum, whereby said pin and stud may be simultaneously operated by a direct and continuous movement of said levers to perforate and extract the cap from one and to cap another shell.

3. The combination, with the pivoted and swinging levers having their bearings first at the pivot and then at the point of the jaws, of an extracting-pin upon one of said levers, and a chamber or groove oppositely arranged upon the other lever, substantially as and for the purpose set forth.

4. The combination, with the lever A, provided with the jaw or head $a^3$, and friction roller or stud E, seat B, and slot $b$, of the lever A', carrying the extracting-pin C, and having the head $a^4$, and seat H, said levers being pivoted together, substantially as and for the purpose described.

LEWIS T. CORNELL.

Witnesses:
JNO. G. ELLIOTT,
WM. C. WHITING.